(12) United States Patent
Katoch

(10) Patent No.: US 10,606,733 B2
(45) Date of Patent: *Mar. 31, 2020

(54) EMPLOYING CODE OVERLAYS TO FACILITATE SOFTWARE DEVELOPMENT

(71) Applicant: ServiceNow, Inc., Santa Clara, CA (US)

(72) Inventor: Sandeep Katoch, Bangalore (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,672

(22) Filed: Aug. 29, 2018

(65) Prior Publication Data

US 2019/0065348 A1 Feb. 28, 2019

Related U.S. Application Data

(63) Continuation of application No. 15/231,801, filed on Aug. 9, 2016, now Pat. No. 10,067,856, which is a continuation of application No. 14/672,536, filed on Mar. 30, 2015, now Pat. No. 9,448,769.

(51) Int. Cl.
*G06F 11/36* (2006.01)
*G06F 8/30* (2018.01)
(Continued)

(52) U.S. Cl.
CPC ............ *G06F 11/3668* (2013.01); *G06F 8/30* (2013.01); *G06F 8/53* (2013.01); *G06F 8/73* (2013.01)

(58) Field of Classification Search
CPC ..... G06F 8/30; G06F 8/53; G06F 8/73; G06F 11/3668

USPC ......................................................... 717/110
See application file for complete search history.

(56) References Cited

U.S. PATENT DOCUMENTS 7,565,640 B2 * 7/2009 Shukla ...................... G06F 8/10
717/105
7,886,198 B2 2/2011 Swoboda et al.
(Continued)

OTHER PUBLICATIONS

Bagge, Anya Helene, "Facts, Resources, and the IDE/Compiler Mind-Meld", Univeristy of Bergen, Norway, Jun. 11, 2013, 12pg. (Year: 2013).*

(Continued)

*Primary Examiner* — Ryan D. Coyer
(74) *Attorney, Agent, or Firm* — Fletcher Yoder PC

(57) ABSTRACT

In one embodiment, a method for editing and testing computer programming code is provided. The method includes receiving a first file comprising computer programming code, and a first code overlay comprising one or more modifications to be applied to the computer programming code of the first file. The method further includes determining a first location within the computer programming code of the first file, at which to apply the first code overlay. The method further includes generating a second file comprising uncompiled composite computer programming code, the uncompiled composite computer programming code comprising the computer programming code of the first file modified by the one or more modifications applied at the first location. The method further includes testing the uncompiled composite computer programming code of the second file.

17 Claims, 7 Drawing Sheets

(51) Int. Cl.
    *G06F 8/73*    (2018.01)
    *G06F 8/53*    (2018.01)

(56) References Cited

U.S. PATENT DOCUMENTS

| | | |
|---|---|---|
| 8,677,322 B2 | 3/2014 | Agarwal et al. |
| 8,719,797 B2 | 5/2014 | Revinskaya et al. |
| 8,930,923 B2 | 1/2015 | Alanis |
| 8,943,477 B2 * | 1/2015 | Martineau ............ G06F 11/362 |
| | | 717/125 |
| 2010/0287539 A1 | 11/2010 | Park et al. |
| 2014/0109059 A1 | 4/2014 | Wisniewski |

OTHER PUBLICATIONS

DeLine et al., "Code Canvas: Zooming towards Better Development Environments", ACM, 2010, 4pg. (Year: 2010).*
Hejmady et al., "Visual attention patterns during programming debugging with an IDE", ACM, 2012, 4pg. (Year: 2012).*
"Debugging Information in Separate Files", Separate Debug Files—Debugging with GOB, Sourceware, Downloaded Jan. 22, 2015, <www .https://sourceware.org/gdb/currentlonlinedocs/gdb/Separate-Debug-Files.html>.
"Debugging Programs That Use Overlays", Debugging with GOB: Overlays, Generated by GOB Administrator on Mar. 29, 2002, <http://davis.lbl.gov/Manuals/GDB/gdb_11.html>.
"Patch (Unix)", From Wikipedia, the free encyclopedia, last modified Dec. 11, 2014, <http://en.wikipedia.org/wiki/Patch_Unix>.
"Diff utility", From Wikipedia, the free encyclopedia, last modified Mar. 17, 2015, <http://en.wikipedia.org/wiki/Diff_utility>.
Katoch, U.S. Appl. No. 14/672,536, filed Mar. 30, 2015.

* cited by examiner

Source Code (src_code001.cpp)

```
45    // default constructor creates TextSrch of 0 bytes
46    TextSrch::TextSrch()
47    {
48        itsTextSrch = new char[1];
49        itsTextSrch[0] = '\0';
50        itsLen=0;
51    }
52    TextSrch::TextSrch(int len)
53    {
54        itsTextSrch = new char[len+1];
55        int i;
56        for ( i = 0; i<=len; i++)
57            itsTextSrch[1] = '\0';
58        itsLen=len;
59    }
60    TextSrch::TextSrch(const char * const cTextSrch)
61    {
62        itsLen = strlen(cTextSrch);
63        itsTextSrch = new char[itsLen+1];
64        int i;
65        for ( i = 0; i<itsLen; i++)
66            itsTextSrch[i] = cTextSrch[i];
67        itsTextSrch[itsLen]='\0';
68    }
69    TextSrch::TextSrch (const TextSrch & rhs)
70    {
71        itsLen=rhs.GetLen();
72        itsTextSrch = new char[itsLen+1];
73        int i;
74        for (i = 0; i<itsLen;i++)
75            itsTextSrch[i] = rhs[i];
76        itsTextSrch[itsLen] = '\0';
77    }
78    // free allocated memory
79    TextSrch::~TextSrch ()
```

FIG. 4a

EMPLOYING CODE OVERLAYS TO FACILITATE SOFTWARE DEVELOPMENT

BACKGROUND OF THE INVENTION

The present invention relates generally to the field of debugging software applications, and more particularly to employing code overlays to apply and remove code from within a software application.

Debugging applications typically involves executing applications in a simulated runtime environment. Debugging an application allows a developer to identify errors in the application's code and correct them. Debugging of applications can be done in numerous ways, including for example, in a development environment used to develop the application code or alternatively in a debugging component associated with a web browser.

An application is defined by application code. The application code may differ depending on the type of device, or the runtime environment in which the application is executed. For example, source code or object code may be written in any combination of one or more programming languages, including an object oriented programming language, such as Smalltalk, C++ or the like, and conventional procedural programming languages, such as the "C" programming language or similar programming languages. Alternatively, the application code may be expressed using a mark-up language, such as hypertext mark-up language (HTML) or a script language. In addition to the application code, the application may also include dynamically generated code, which is generated by the application code during execution of the application. Depending on the programming language that is used to create a software application, the application code may need to be compiled into a machine language version of the application. Other programming languages are capable of being executed via a software interpreter. Interpreters and compilers are not mutually exclusive. An interpreter may execute a program by parsing the source code and performing its behavior directly, by translating source code into some efficient intermediate representation and immediately executing the representation, or by explicitly executing stored, precompiled code made by a compiler that is part of the interpreter system.

SUMMARY

According to one embodiment of the present invention, a method for editing and testing computer programming code is provided, the method comprising: receiving, by one or more computer processors, a first file comprising computer programming code; receiving, by one or more computer processors, a first code overlay comprising one or more modifications to be applied to the computer programming code of the first file; determining, by the one or more computer processors, a first location within the computer programming code of the first file, at which to apply the first code overlay; generating, by one or more processors, a second file comprising uncompiled composite computer programming code, the uncompiled composite computer programming code comprising the computer programming code of the first file modified by the one or more modifications applied at the first location; and testing, by one or more computer processors, the uncompiled composite computer programming code of the second file.

BRIEF DESCRIPTION OF THE DRAWINGS

FIG. 4a depicts an illustrative example of a source code snippet, in accordance with an embodiment of the present invention.

DETAILED DESCRIPTION

Figure 1:
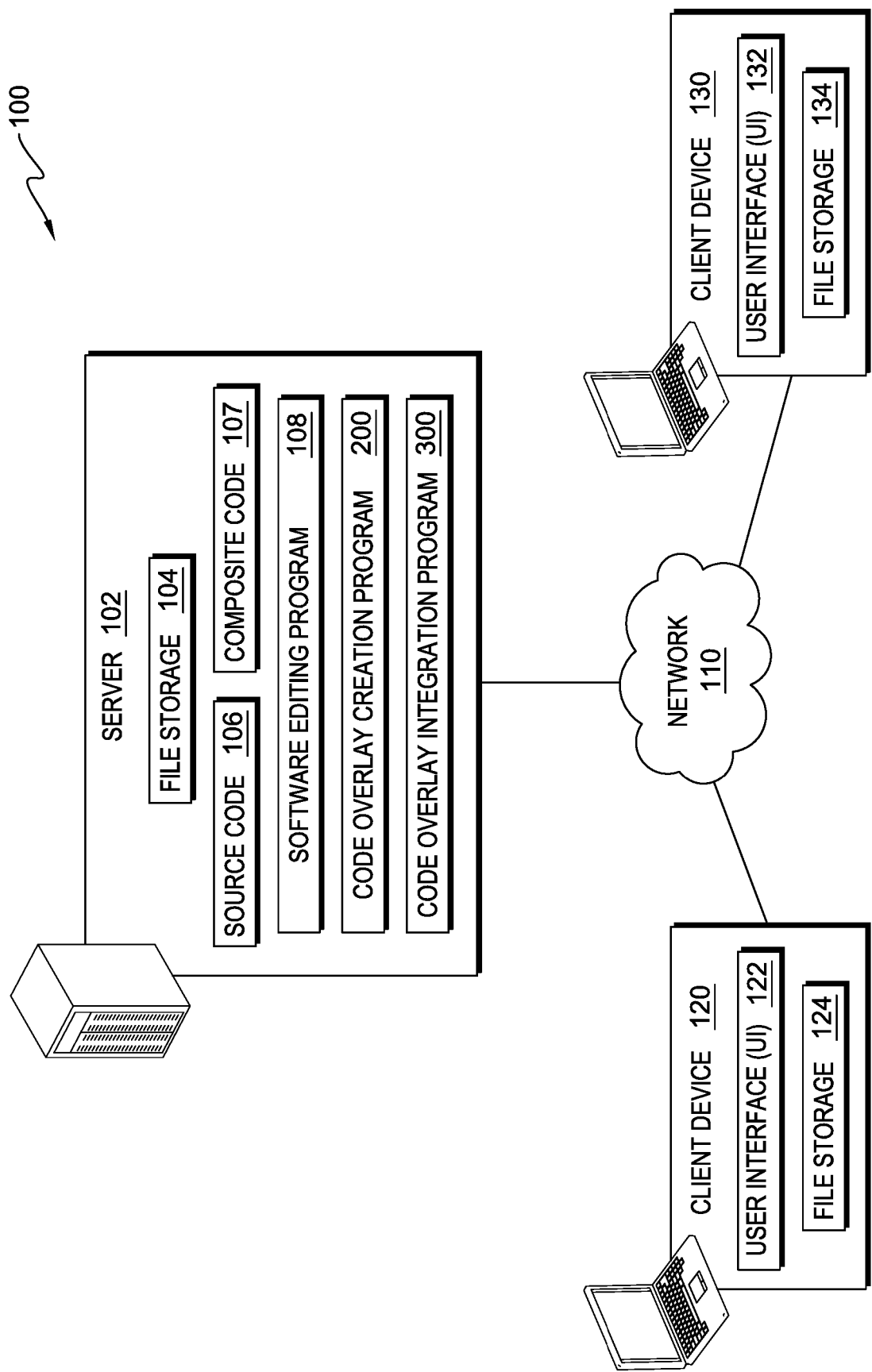
FIG. 1 illustrates a distributed data processing environment, in accordance with an embodiment of the present invention.

Embodiments of the present invention recognize that debugging computer programming code and fixing defects are necessary steps in the software development cycle. For example, programmers can use temporary portions of computer programming code to: output (e.g., print out) debug statements, debug error messages, force specific paths in code, assign preset sources of information (e.g., variables, director paths, file names, tables, links to other software modules or applications, etc.) and then undo these changes (e.g., temporary portions of code). Some software languages provide options to incorporate logical statements that remove the debug code from the source code allowing the conditional compiling of a program. Embodiments of the present invention recognize that utilizing conditional compiling of a program has drawbacks. Some of these drawbacks include that the "undo" change option may be complicated when some changes are to be preserved, and "undo" typically does not allow changes to be preserved for future use. Other drawbacks to conditional compilation for managing debug options include: conditional flags need to be managed to control which options are incorporated and which options are excluded from the compiled program, creating statements that facilitate conditional compiling adds complexity to the source code and forms sources of errors when improperly structured, and improperly structured conditional compilation statements may incorporate unwanted debug code within the compiled program.

Embodiments of the present invention provide users a method, via code overlays, to individually or collaboratively test and debug software programs without adding extraneous programming instruction to a source code file. Embodiments of the present invention apply code overlay to source code to generate composite code, leaving the source code unaltered (e.g., in an original state). Embodiments of the present invention provide the capability to save the composite code in various configurations (e.g., as composite code, as a testing/debugging scheme, and/or as a new version of source code). For example, code overlays can be comprised of one or more lines of computer programming code that: output error information produced by executing the source code, output information produced by portions of the source code, specify input information employed by the source code, dictate execution paths in the composite computer programming code of the second file, and/or provide documentation information. In addition, a code overlay may also include text that is informational as opposed to executable code, and some, none, or all of the informational text can be applied to the source code. For example, information embedded within a code overlay or associated with a code overlay may include: location information (e.g., source code line number, source code offset/index value), the name of a code overlay, the directory location of a code overlay, a permission level, the author (e.g., programmer) of the code overlay, source code file employing the code overlay, etc. In various embodiments of the present invention, some operating systems may provide Diff/Patch (not shown) mechanisms (e.g., utilities, functions) that provide a method to identify code overlays written within a file of modified source code and another method to revert the modified source code to the original source code (e.g., original state).

In some embodiments of the present invention, debugging code may be initially written in the source code to be subsequently converted to a code overlay, stored, and disassociated from the source code when not needed, leaving the source code unaltered. In these embodiments, a code overlay is associated with a specific location within the source code. Further embodiments facilitate the creation of a library of code overlays that contain code overlays that may be selected by a user to be applied to other locations within a source code file or the creation of configurations (e.g., schemes) to test and debug other source code files. For example, by incorporating lists, tables, cross-references, meta-data, and script functions, embodiments of the present invention permit: code overlays to be shared between users, the creation of multiple testing and debugging schemes for a source code file, testing and debugging results to be stored and associated with a testing and debugging scheme, and applying testing and debugging schemes created for one source code file to be adapted for use with a different source code file. Other embodiments of the present invention provide capabilities that permit code overlays to be created off-line (e.g., outside of the source code, using a different editing program, etc.), stored in a library, and selected and applied to a file of source code as needed.

Additional embodiments of the present invention provide additional functionality that responds to information embedded in a code overlay. For example, a code overlay may contain one or more functional lines of text that are comprised of a character or combinations of characters whose syntax defines various functions and methods to process commands, variables, text, and code that effects the behavior of a code overlay, as opposed to incorporation within the source code. Examples of the effects of syntax commands within a functional line of text within a code overlay are syntax commands to: define an insertion point, generate pseudo-code, define number of repetitions of inserted code, and chain/combine actions. In one embodiment, a code overlay may have the capability to identify lines of source code located relative to the application location of the code overlay (e.g., insertion point, offset value, line number, etc.) and execute one or more actions defined within the code overlay on the identified lines of source code. For example, a first portion of a code overlay may comment-out lines of source code prior to applying the programming code comprising a subsequent portion of the code overlay. In another embodiment, a code overlay converts the identified lines of source code to another code overlay, replaces the identified lines of source code with some or all of the code comprising the code overlay, and embeds information within the other code overlay that facilitates an undo option once the testing and debug of the source code is complete. In further embodiments, pseudo-code within a code overlay may produce lines of text which are subsequently applied to generate the composite code, or the pseudo-code may generate additional functional lines within the code overlay, which affects the generation of composite code.

The descriptions of the various scenarios, instances, and examples related to the present invention are presented for purposes of illustration but are not intended to be exhaustive or limited to the embodiments disclosed. Similarly, the descriptions of the various layouts, syntax, functions, and capabilities associated with code overlays related to the present invention are presented for purposes of illustration but are not intended to be exhaustive or limited to the embodiments disclosed. The descriptions of the various scenarios, instances, and examples related to the present invention utilize the convention that an insertion point, or an offset value associated with applying information from a code overlay to source code, occurs below a line of code associated with the insertion point or the offset value. Deletion of source code, or replacement of source code, occurs at the line of code associated with the insertion point or the offset value. In general, any desired convention can be used.

The present invention will now be described in detail with reference to the Figures. FIG. 1 is a functional block diagram illustrating distributed data processing environment 100 in an embodiment, in accordance with the present invention. An embodiment of distributed data processing environment 100 includes server 102, client device 120, and client device 130 interconnected over network 110. Many modifications to the depicted environment may be made by those skilled in the art without departing from the scope of the invention as recited by the claims.

Server 102, client device 120, and client device 130 may be laptop computers, tablet computers, netbook computers, personal computers (PC), desktop computers, personal digital assistants (PDA), smart phones, or any programmable computer systems known in the art. In certain embodiments, server 102, client device 120, and client device 130 represent computer systems utilizing clustered computers and components (e.g., database server computers, application server computers, etc.) that act as pools of seamless resources when accessed through network 110, as is common in data centers and with cloud-computing applications. In general, server 102, client device 120, and client device 130 are representative of any programmable electronic devices or combination of programmable electronic devices capable of executing machine readable program instructions, as depicted and described in further detail with respect to FIG. 5.

Server 102 includes file storage 104, source code 106, composite code 107, software editing program 108, code overlay creation program 200, and code overlay integration program 300. Server 102 can also include various other programs that are not shown for illustrative purposes (e.g., text editor, software debug utility, etc.). In some embodiments, server 102 may contain a database program that maintains libraries of code overlays (not shown), maintains listings of code overlays and associated offsets for various software applications (not shown), and controls access/permission levels of code overlays (e.g., shared, private, secured, read-only, update, delete, etc.). In some embodiments, software editing program 108, code overlay creation program 200, code overlay integration program 300, a database program, and other functions (not shown) are bundled together as an integrated development environment (IDE) (e.g., software suite). In other embodiments, the IDE (not shown) is a separate software suite. The IDE may include software editing program 108 and a dedicated debugger program (not shown).

In one embodiment, file storage 104 contains one or more databases and lists of code overlays and associated information. For example, file storage 104 may contain: libraries of code overlays (e.g., code overlay file names, code overlay descriptions, revision levels, etc.) maintained by a database program, listings of code overlays and associated offsets/ indexes for various software applications, information controlling the access/permission levels of code overlays (e.g., shared, private, secured, read-only, update, delete, etc.), and tables cross referencing various testing schemes (e.g., applied code overlays) used for testing source code 106, and the results of utilizing the various testing schemes. File storage 104 may also contain the one or more resultant files of testing and/or debug activity which include: error codes, error messages, variables, exception handling, dictated execution paths, lists, database tables, etc. In some instances, a user of client device 120 may review the resultant files in-situ (e.g., while executing composite code 107) and compare the obtained results with the results expected from executing source code 106. In other instances, a user of server 102 may review the files resulting from the execution of composite code 107 and compare the obtained results with the results expected from executing source code 106. In another embodiment, file storage 104 contains individual instances of code overlays. For example, each instance of a code overlay, contained within file storage 104, contains one defined offset/index identifying the location where that instance of a code overlay is applied to source code 106. In some embodiments, file storage 104 contains composite computer programming code generated by code overlay integration program 300.

Source code 106 is comprised of computer programming code that includes executable lines of code and lines of code that are comments.

Composite code 107 is comprised of source code 106 and one or more code overlays. In one embodiment, composite code 107 contains unmodified source code 106 and one or more code overlays applied at dictated locations within source code 106. In one scenario, offset values (e.g., index, number associated with a line of source code) that dictate the locations of the one or more code overlays are defined within each of the one or more code overlays. In some scenarios, composite code 107 is comprised of code overlays that may be applied at more than one location within source code 106. For example, a code overlay may contain three offset values associated with source code 106. The code overlay is applied at each of the identified locations respectively associated with an offset value.

In one embodiment, software editing program 108 executes on server 102 and is accessed by client device 120 and client device 130 via network 110. Software editing program 108 is utilized by a user of client device 120 and a user of client device 130 via UI 122 and UI 132, respectively. In another embodiment, a version of software editing program 108 executes on client device 120 and client device 130, respectively (not shown), and uploads code overlays to server 102. In some embodiments, software editing program 108 provides a user of client device 120 the capability to create a code overlay and the ability to define a location within source code 106 where code overlay integration program 300 should apply the code overlay.

Code overlay creation program 200 produces code overlays. Code overlay creation program 200 may execute concurrently with software editing program 108 and code overlay integration program 300. In one embodiment, code overlay creation program 200 receives one or more indications from software editing program 108 that a user converts a portion of source code 106 to a code overlay. For example, code overlay creation program 200 can remove a portion of source code 106 that is now a code overlay and determine a location where the code overlay initially existed. In one scenario, code overlay creation program 200 defines an offset/index value within the code overlay based on the location from where the code overlay was removed from source code 106. In another scenario, code overlay creation program 200 determines an offset/index that is associated with the source code 106 and the code overlay and store the information in a table. In another embodiment, code overlay creation program 200 receives an indication from software editing program 108 that a code overlay is applied to source code 106. The indication received by code overlay creation program 200 includes the name of the code overlay and a location (e.g., library) where the code overlay is stored.

In some embodiments, code overlay creation program 200 incorporates the offset/index (e.g., line number) as a definition within the code overlay. In other embodiments, code overlay creation program 200 generates an offset/index value for the code overlay and stores the offset/index value within at least one of: one or more lists and one or more tables of a database. Additionally, code overlay creation program 200 determines whether source code 106 is modified while a user creates one or more code overlays. Code overlay creation program 200 resolves conflicts attributed to modifications of source code 106 by at least one of: determining whether the affected instance of source code 106 is on a shared location, determining whether a modification to source code 106 occurs in a portion of code where a user is creating a code overlay, determining one or more user preferences, and determining one or more IDE preferences. In further embodiments of the present invention, code overlay creation program 200 may compare two versions of source code 106 to generate a file identifying the differences between the two versions of source code 106. The file identifying the differences between the two versions of source code 106 may be utilized to adjust offset values for code overlays created by code overlay creation program 200 or utilized by code overlay integration program 300.

Code overlay integration program 300 receives, generates, displays, and executes composite computer programming code based on applying one or more code overlays to source code 106. In some embodiments, code overlay integration program 300 receives a composite code configuration that may apply additional code overlays, removes one or more code overlays, undo changes to a portion of source code 106 previously initiated by a code overlay, and performs additional executions of the composite code. In one embodiment, code overlay integration program 300 applies code overlays in a sequential process and updates (e.g., applies biases) the offset values of subsequent code overlays, as the effect of a current code overlay or previous code overlays is applied to source code 106 and as the lines of code comprising composite code 107 are renumbered. In another embodiment, code overlay integration program 300 receives location information where each of the code overlays associated with source code 106 are applied. Code overlay integration program 300 can apply the code overlays in a parallel process, renumbering the lines of code after the code overlays are applied. In one scenario, code overlay integration program 300 applies the code overlays based on offset values defined within individual code overlays. In another scenario, code overlay integration program 300 receives at least one of: one or more lists and one or more tables identifying the code overlays applied to source code 106. The list or table of code overlays can include, for example, line numbers or offset values identifying the locations where code overlay integration program 300 should apply each code overlay.

Additionally, code overlay integration program 300 can also facilitate the testing and debugging of source code 106. In some embodiments, code overlay integration program 300 provides users one or more visual indications within composite code 107 that identify differences between source code 106 and code overlays. Code overlay integration program 300 can also provide visual indications of additions and deletions to source code 106 as incorporated within composite code 107, execution paths affected (e.g., dictated) by code within applied code overlays, and sources of data used for the execution of composite code 107. Examples of visual indications provided by code overlay integration program 300 may include: applying different colors to lines of source code, as opposed to colors applied to lines of code from a code overlay; depicting deleted lines of source code by use of a strikethrough font and removal of line numbers; applying a bold font to portions of source code modified by a code overlay; and enclosing in parentheses the original portions of source code that were subsequently modified by a code overlay. In one scenario, code overlay integration program 300 includes graphical (e.g., display) capabilities. In another scenario, code overlay integration program 300 utilizes the graphical (e.g., display) capabilities of another program, such as software editing program 108, a software interpreter (not shown), or an IDE. In other embodiments, code overlay integration program 300 executes composite code 107. For example, the applied code overlays may: output error information produced by executing composite code 107; output information specified by a code overlay; pause the execution of composite code; generate one or more handling exceptions; and store data and results for off-line analysis, as dictated by a code overlay. In various embodiments, code overlay integration program 300 receives an indication from a user, via UI 122, that a version of composite code 107 is saved as a different source code 106 file. For example, a user may indicate that some, none, or all of the code overlays and updates determined from the debugging activity of composite code 107 are saved as a different version of source code 106.

In other embodiments, code overlay integration program 300 resolves conflicts attributed to modifications of source code 106 by determining at least one of: whether the affected instance of source code 106 is on a shared location; whether a modification to source code 106 occurs in a portion of code where a user is creating a code overlay; an order of precedence (e.g., time-stamp, hierarchy, etc.) associated with the modifications to source code 106; or the application of a code overlay, one or more user preferences, and one or more IDE preferences. In further embodiments, code overlay integration program 300 may compensate for a conflict by identifying a file that includes the differences between two versions of source code 106 and may modify the application of one or more code overlays based on information included within the file identifying the differences between two versions of source code 106.

In one embodiment, client device 120, client device 130, and server 102 communicate through network 110. Network 110 can be, for example, a local area network (LAN), a telecommunications network, a wireless local area network (WLAN), a wide area network (WAN), such as the Internet, or any combination of the previous, and can include wired, wireless, or fiber optic connections. In general, network 110 can be any combination of connections and protocols that will support communications between client device 120, client device 130, and server 102, in accordance with embodiments of the present invention. In another embodiment, network 110 operates locally via wired, wireless, or optical connections and can be any combination of connections and protocols (e.g., near field communication (NFC), laser, infrared, etc.).

Client device 120 and client device 130, respectively, include user interfaces (UI) 122 and 132, file storage 124 and 134, and each may include a web browser application (not shown) and various other programs (not shown). Client device 120 and client device 130 may also include one or more software editing programs (not shown). A software editing program may be a stand-alone software application, a function included in a web browser, part of a software compiler/interpreter, or may reside on server 102 accessible via UI 122 or UI 132. A user of client device 120 or client device 130 can interact with UI 122 or UI 132, respectively, via a singular device, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser, a software editing program, etc.) can generate UI 122, operating within the GUI of client device 120, or generate UI 132, operating within the GUI of client device 130. UI 122 accepts input from a plurality of input/output (I/O) devices (not shown) including, but not limited to, a tactile sensor interface (e.g., a touch screen, a touchpad) or a natural user interface (e.g., voice control unit, motion capture device, etc.). An I/O device interfacing with UI 122 may be connected to client device 120 which may operate utilizing wired (e.g., USB port) or wireless network communications (e.g., infrared, NFC, etc.). For example, an I/O device may be a peripheral, such as a keyboard, a mouse, a trackball, and a click wheel that provide input from a user.

Figure 2:
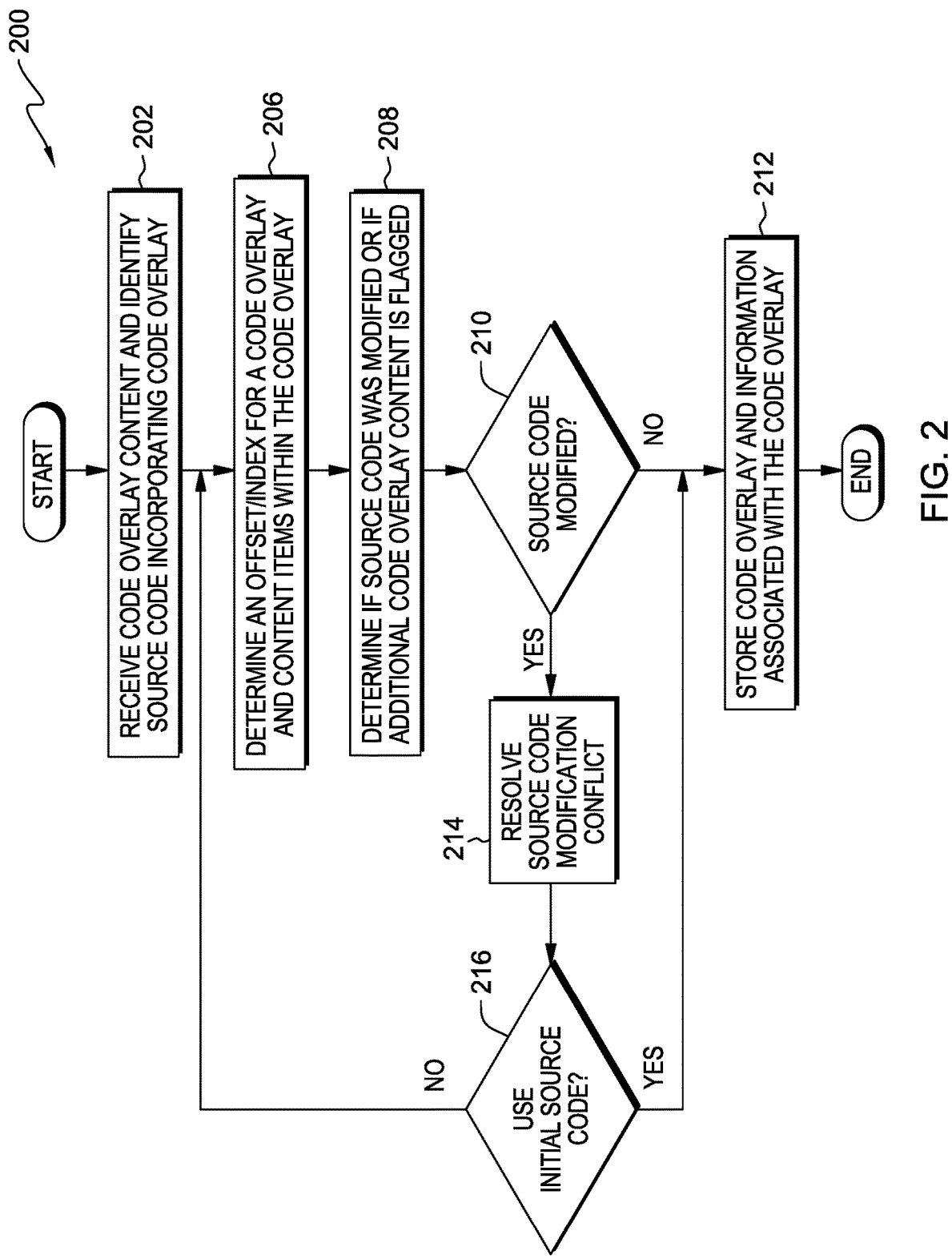
FIG. 2 depicts a flowchart of operational steps of a code overlay creation program, in accordance with an embodiment of the present invention.

FIG. 2 is a flowchart depicting operational steps for code overlay creation program 200 executing on server 102.

In step 202, code overlay creation program 200 receives code overlay content and identifies source code incorporating code overlay. The content of a code overlay may be of a singular type or a combination of types. The types of content that comprises a code overlay include executable source code, documentation information, values for variables, references to specific data or files (e.g., directory paths, file names, databases, etc.), debugging, and temporary code that dictates the source code to utilize specific paths. In one embodiment, code overlay creation program 200 receives a code overlay that is created off-line. For example, a code overlay may be created by a text editor, a software editor, or may be copied from another source (e.g., a webpage, a document, the source code of another program). In this embodiment, the code overlay may not contain an offset or index value. In some embodiments, code overlay creation program 200 may permit a user to edit the syntax information that controls the code overlay.

In another embodiment, code overlay creation program 200 receives the code overlay content from the source code that is debugged. In one scenario, code overlay content is created within source code 106, and software editing program 108 supports code overlay creation program 200. In this scenario, code overlay creation program 200 sets a flag (e.g., pointer value) associated with the location within the original source code file where the code overlay was created. In another scenario, code overlay creation program 200 receives the code overlay content from text edited (e.g., cut) from the original source code file. Additionally, code overlay creation program 200 identifies the source code (i.e., source code 106) incorporating a code overlay. For example, code overlay creation program 200 identifies the file name and the directory structure associated with source code 106 via software editing program 108. The information identifying the source code may subsequently be associated with the code overlay or as data within a list or table that identifies a code overlay with a specific source code file.

In step 206, code overlay creation program 200 determines an offset or index associated with a code overlay and the content items within the code overlay. The offset/index describe the location within source code 106 where the code overlay is subsequently applied. In one embodiment, the offset/index associated with a code overlay is embedded within the code overlay. In addition, code overlay creation program 200 tracks the number of lines of text associated with the received content of a code overlay or the flagged content associated with a code overlay. In one scenario, code overlay creation program 200 may determine that multiple instances of a code overlay are associated with source code 106. Code overlay creation program 200 determines an offset/index value for each occurrence of a code overlay associated with editing/bugging source code 106 and code overlay creation program 200. In another scenario, code overlay creation program 200 creates a code overlay for each occurrence of the code overlay within the source code. Each code overlay may contain one or more offset/index values. For example, if code overlay creation program 200 determines that multiple instances of the same text occur within a code overlay, code overlay creation program 200 may summarize the text and associated offset/index values as a more concise format within the code overlay. In some embodiments, code overlay creation program 200 updates the offset/index values of one or more code overlays based on modification to source code 106, the flagging of additional code overlay content, and/or the tracked number of lines of text associated with code overlay content.

In another embodiment, code overlay creation program 200 interacts with a database program to store the offset/index values for code overlays associated with debugging source code 106 in one or more lists and/or one or more tables, as opposed to defining the offset/index values within the code overlays. The structure of such embodiments facilitates, for example, the reuse of a code overlay, the sharing of a code overlay, and applying the code overlay to different composite code 107 testing and debug configurations (e.g., scheme01, scheme02, etc.).

Tables 1 and 2 are illustrative examples of embodiments of the present invention utilizing debugging schemes that apply multiple code overlays at various offset location within source code 106. In this embodiment, for testing and debug files "Name.v01.scheme01.html" and "Name.v01.scheme02.html", the syntax controls within a code overlay use the instance fields of Tables 1 and 2 to identify the number of times that a code overlay is applied to source code 106 (e.g., Name.v01.html), and the offset value fields of Tables 1 and 2 as the insertion points for the code overlay, respectively. In some scenarios, the value of a field is directly written within a line of syntax for a code overlay. In other scenarios, the line of syntax incorporates a variable as part of the statement where the variable updates based on a scheme (e.g., debug configuration).

TABLE 1

Example code overlay list with offsets associated with testing and debug configuration file: Name.v01.scheme01.html d:\IDE\source code\Name.v01.html
Name

| Instance | Code Overlay.001.txt Directory location d:\libraries\ overlays Offset value | Code Overlay.002.txt Directory location d:\libraries\ overlays Offset value | Code Overlay.003.txt Directory location d:\libraries\ overlays Offset value |
|---|---|---|---|
| 1 | 5 | 15 | 25 |
| 2 | 30 | — | 40 |
| 3 | — | — | 60 |

TABLE 2

Example code overlay list with offsets associated with testing and debug configuration file: Name.v01.scheme02.html d:\IDE\source code\Name.v01.html
Name

| Instance | Code Overlay.001.txt Directory location d:\libraries\ overlays Offset value | Code Overlay.003.txt Directory location d:\libraries\ overlays Offset value | Code Overlay.004.txt Directory location d:\libraries\ overlays Offset value |
|---|---|---|---|
| 1 | 5 | 25 | 76 |
| 2 | 30 | 40 | — |
| 3 | — | 60 | — |

In step 208, code overlay creation program 200 determines whether source code 106 was modified while a code overlay was developed or whether additional code overlay content was flagged. In one embodiment, code overlay creation program 200 determines whether source code 106 was modified while developing a code overlay, and code overlay creation program 200 determines one or more offset/index values for the code overlay and associated code overlay content. For example, code overlay creation program 200 compares the file attributes (e.g., file size, time stamp, etc.) of source code 106 stored in file storage 104 to the file attributes of source code 106 identified in step 202. In another embodiment, code overlay creation program 200 determines whether additional code overlay content is flagged. In one scenario, code overlay creation program 200 determines that one or more lines of code flagged as code overlay content were copied to another portion of source code 106 utilizing software editing program 108. In another scenario, another one or more lines of source code 106 are flagged as content for a code overlay. In one instance, flagged content is associated with one code overlay. In another instance, the flagged content is associated with a different code overlay generated by further modification to source code 106, which triggers a loop back to step 206 (via yes branch; decision step 210). In some instances, code overlay creation program 200 determines that portions of the flagged content are respectively associated with the creation of two or more code overlays.

In decision step 210, in response to a determination that source code 106 was modified (yes branch; decision step 210), code overlay creation program 200 resolves the conflict associated with different versions (e.g., files containing modifications) of source code 106 (step 214).

Having determined that additional code overlay content is flagged, in step 208, code overlay creation program 200 subsequently resolves the conflict associated with the additional flagged code overlay content (yes branch; decision step 210). In some embodiments, code overlay creation program 200 determines that source code 106 was both modified and additional code overlay content was flagged (yes branch; decision step 210).

In step 214, code overlay creation program 200 resolves the conflict caused by the modification of source code 106 while one or more code overlays were developed. In one embodiment, code overlay creation program 200 resolves the conflict between versions (e.g., copies of source code 106 that contain different modifications) of source code 106 and uses the initial version of source code 106. In one scenario, code overlay creation program 200 resolves the modification conflict affecting source code 106 by determining that code overlay creation program 200 and code overlay integration program 300 are operating on the same version of source code 106. For example, a user of client device 120 and a user of client device 130 may be separately debugging respectively developed portions of source code 106. Both users may modify source code 106 while creating code overlays for their respective portions of source code 106. However, code overlay creation program 200 determines that each user is executing different instances of code overlay creation program 200 and code overlay integration program 300, operating on separate copies of source code 106, so modifications to source code 106 do not cause a conflict. In another scenario, code overlay creation program 200 determines that a user of client device 120 and a user of client device 130 are collaboratively debugging portions of source code 106 that were respectively developed. Code overlay creation program 200 determines that no conflict occurs since the modification of portions of source code 106 of one user do not occur at the locations of code overlays of the other user. In some scenarios, code overlay creation program 200 resolves the conflict between versions of source code 106 by analyzing at least one of: one or more user preferences and one or more software development preferences. For example, code overlay creation program 200 may determine that a software development preference dictates that a user downloads a copy of source code 106 to local storage (e.g., file storage 124 on client device 120) and executes code overlay creation program 200 and code overlay integration program 300 remotely, via UI 122 and network 110.

In another embodiment, code overlay creation program 200 resolves conflict between a modified version of source code 106 and the initial version of source code 106 and selects the modified version of source code 106. For example, portions of source code 106 may be converted to one or more code overlays, and the code line values for the modified version of source code 106 can be changed. These changes affect the offset values of code overlays applied to the modified version of source code 106.

In some embodiments, the stored version of source code 106 is not modified. However, code overlay creation program 200 determines that a version of source code 106 active in software editing program 108 is modified by the creation of one or more additional code overlays or content assigned to one or more other code overlays. Code overlay creation program 200 can determine that a conflict occurs based on numbering changes associated with the code line values of the edited version of source code 106. Code overlay creation program 200 compensates offset values for one or more code overlays for the one or more changes in code line numbering of source code 106.

In response to a determination that the initial version of source code 106 is not used (no branch; decision step 216), code overlay creation program 200 loops to step 206. In one embodiment, code overlay creation program 200 determines a new offset/index value (at step 206) for the code overlay based on the modified version of source code 106. In another embodiment, code overlay creation program 200 determines that the offset/index value of the code overlay did not change. In some embodiments, code overlay creation program 200 updates the information associating the code overlay with the modified version of source code 106. For example, the modified version of source code 106 may have a different file name or a different directory location.

In decision step 216, in response to a determination that the initial version of source code 106 is used (yes branch; decision step 216), code overlay creation program 200 stores the code overlay and the information associated with the code overlay (step 212).

Referring to decision step 210, in response to a determination that source code 106 was not modified (no branch; decision step 210), code overlay creation program 200 stores the code overlay and information associated with the code overlay.

In step 212, code overlay creation program 200 stores the code overlay and information associated with the code overlay. In some embodiments, information related to a code overlay is stored in at least one of a list and a table. For example, Table 3 depicts a list of example code overlays and associated offsets for a modified version (e.g., v02) of source code file Name.html utilizing test and debug configuration (e.g., scheme01). In this example, code overlay creation program 200 determined, in step 206, that multiple changes occurred between source code files Name.v02.html and Name.v01.html. In Table 3, code overlay creation program 200 adjusts the offset values associated with code overlays by signifying the bias value in parentheses (e.g., (+5)). Code overlay creation program 200 determines that no modifications that effected the line numbering of source code Name.v02.html occurred prior to code line 15. Code overlay creation program 200 also determines that a first modification to source code Name.v02.html occurred after code line 15 and before code line 25, and the first modification added five lines of code. Code overlay creation program 200 determines that a second modification to source code Name.v02.html occurred after code line 30 and before code line 40 and that the second modification removed (e.g., deleted) two lines of code. Code overlay creation program 200 determines that a third modification to source code Name.v02.html occurred after code line 40 and before code line 60, and the third modification added three lines of code.

TABLE 3

Example code overlay list with offsets associated with testing and debug configuration file: Name.v02.scheme01.html

| | d:\IDE\source code\Name.v02.html | | |
|---|---|---|---|
| | Name | | |
| | Code Overlay.001.txt | Code Overlay.002.txt | Code Overlay.003.txt |
| | | Directory location | |
| Instance | d:\libraries\ overlays Offset value (bias values) | d:\libraries\ overlays Offset value (bias values) | d:\libraries\ overlays Offset value (bias values) |
| 1 | 5 (+0) | 15 (+0) | 25 (+5) |
| 2 | 30 (+5) | — | 40 (+5) (−2) |
| 3 | — | — | 60 (+5) (−2) (+3) |

In other embodiments, the information is embedded within the code overlay, such as flags, variables, delimiters, and syntax structures (e.g., commands) that prevent the incorporation of information within the composite code. Examples of the effect of syntax structures include: defining an insertion point; generating pseudo-code; defining a number of repetitions of the inserted code; identifying comments; and performing chain/combined actions. In some scenarios, code overlay creation program 200 saves an offset/index value associated with each line of text that is subsequently utilized to generate composite code 107. In other scenarios, code overlay creation program 200 summarizes the content of a code overlay. In some instances, code overlay creation program 200 identifies common lines of text and determines an absolute offset/index value for each occurrence of a line of text. In other instances, code overlay creation program 200 utilizes a combination of absolute offset/index values and relative values (e.g., the number of lines of code to skip prior to the next instance of the code overlay).

In another embodiment, code overlay creation program 200 identifies the code overlay and information associated with the code overlay via a Diff utility and stores the results. In one scenario, code overlays are created and saved in a sequential manner and code overlay creation program 200 creates multiple Diff files (not shown). In some scenarios, code overlay creation program 200 creates Diff files that refer back to the source code, and the Diff files may be used to undo one code overlay independent of other code overlays. In other scenarios, code overlay creation program 200 creates subsequent Diff files based on the cumulative changes to the source code associated with previous code overlays that appear in the edited version of the code. Subsequently, in some embodiments, code overlay integration program 300 utilizes a Patch utility to apply the code overlays and/or the files, created by a Diff utility, to source code 106 to generate composite code 107. In some instances, utilizing a Diff utility and a Patch utility may limit the capabilities of code overlays.

Figure 3:
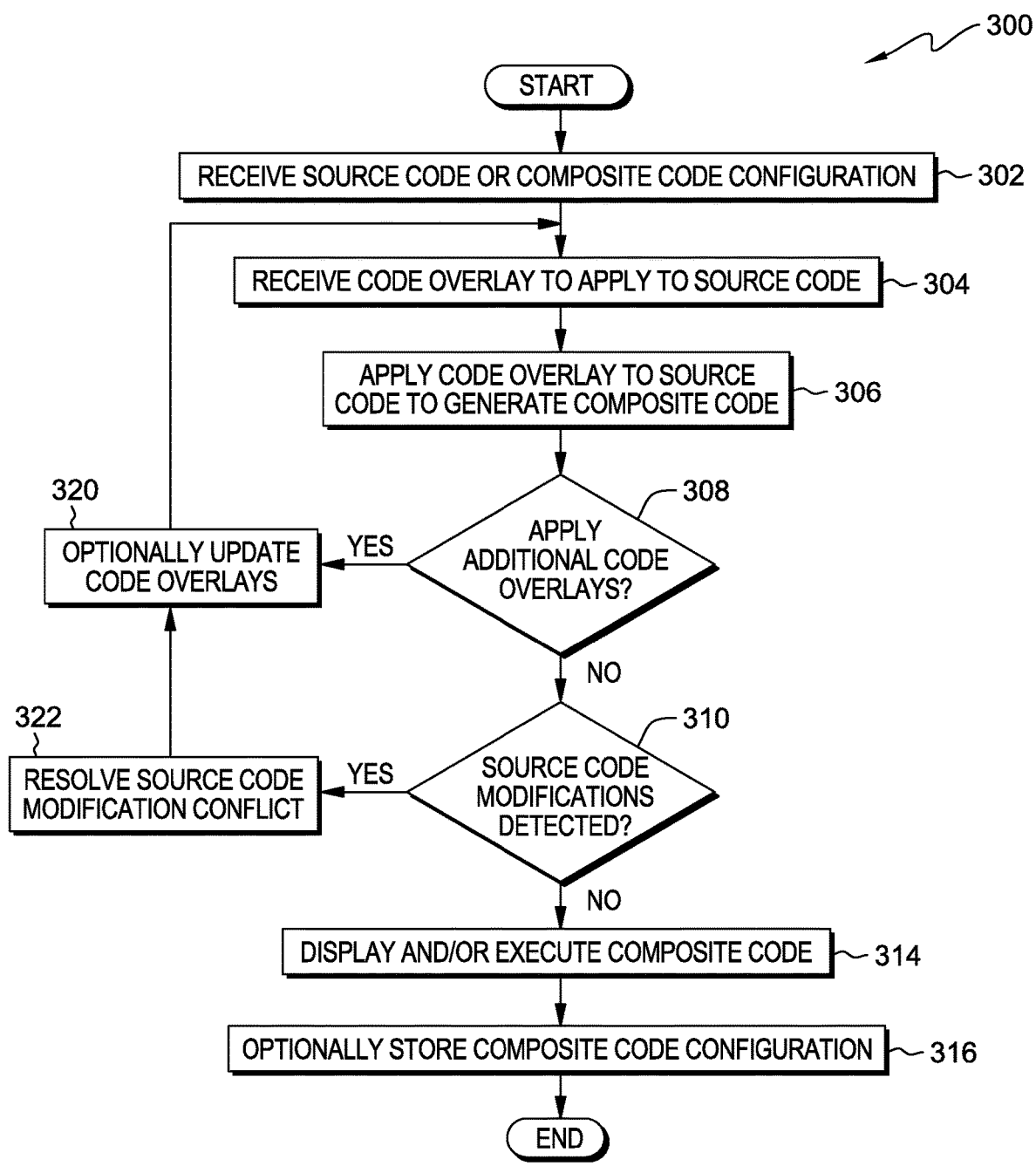
FIG. 3 depicts a flowchart of operational steps of a code overlay integration program, in accordance with an embodiment of the present invention.

FIG. 3 is a flowchart depicting operational steps of code overlay integration program 300. Code overlay integration program 300 respectively monitors client device 120 and activities of the user of client device 120 and client device 130 and activities of the user of client device 130. Code overlay integration program 300 may execute concurrently with software editing program 108 and code overlay creation program 200. In some embodiments, code overlay integration program 300 includes display capabilities that enable a user to monitor the application of one or more code overlays to source code 106, which in turn generates composite code 107. In other embodiments, code overlay integration program 300 utilizes the display capabilities of software editing program 108 to apply and monitor one or more code overlays to source code 106, which in turn generates composite code 107.

In step 302, code overlay integration program 300 receives source code 106 or a composite code configuration. In one embodiment, code overlay integration program 300 receives source code 106 as a function of a user of client device 120 creating a code overlay via software editing program 108. In another embodiment, code overlay integration program 300 receives source code 106 based on debug activity initiated by an integrated development environment (IDE). In some embodiments, code overlay integration program 300 determines the file attributes of the received version of source code 106 for subsequent detection of modifications to source code 106. In a different embodiment, code overlay integration program 300 receives a composite code configuration. For example, rather than creating an original testing/debugging configuration, a user of client device 130 selects and receives a composite code configuration created and stored by the user of client device 120. The user of client device 130 subsequently modifies, via UI 132, the received composite code configuration to facilitate the testing and debug activity that is the responsibility of the user of client device 130.

In step 304, code overlay integration program 300 receives a code overlay to apply to source code 106. In one embodiment, code overlay integration program 300 receives a code overlay as part of the activities of a user of client device 120 creating a code overlay by executing software editing program 108. In another embodiment, code overlay integration program 300 receives a code overlay based on at least one of a file and table previously linked to source code 106 as part of a software development process.

In step 306, code overlay integration program 300 applies a code overlay to source code 106 to generate composite code 107. In some embodiments, code overlay integration program 300 enables a user to differentiate code overlays from source code. For example, composite code 107 is displayed in one column where source code is displayed as one color text, code overlays are displayed as one or more different colors, and deleted text may be displayed as indented without code line values and depicted by a strikethrough text font. In another example, code overlay integration program 300 displays composite code 107 in two columns, where the left column depicts source code 106 with some types of modifications identified and spaces added signifying the code lines added by a code overlay, and the right column depicts the one or more code overlays. In one embodiment, code overlay integration program 300 generates composite code 107 by applying one or more code overlays to source code 106 at one or more dictated locations, and code overlays may perform one or more modifications to source code 106. In this embodiment, the one or more modifications that may occur as the result of code overlay integration program 300 applying one or more code overlays include: adding one or more lines of computer instructions; adding one or more lines of comments; removing one or more lines of computer instructions; and removing one or more lines of comments. In some embodiments, code overlay integration program 300 applies commands (e.g., delete one or more lines of computer instruction, substitute one or more lines of computer instructions, etc.) within a code overlay prior to inserting the computer instruction comprising the code overlay. In another embodiment, code overlay integration program 300 preserves the one or more removed lines of computer instructions of source code 106. In one scenario, code overlay integration program 300 leaves the one or more lines of computer instruction within source code 106 as comment lines. In some instances, code overlay integration program 300 creates a code overlay that contains instructions to revert the comments to computer instructions. In another scenario, code overlay integration program 300 converts the one or more removed lines of computer instructions to a code overlay. In another embodiment, code overlay integration program 300 does not preserve the one or more removed (e.g., deleted) lines of computer instructions and comments.

Additionally, code overlay integration program 300 tracks the numbering of source code 106 as one or more code overlays are applied to source code 106. In one embodiment, code overlay integration program 300 applies the dictated one or more code overlays in a parallel process and updates the numbering of the lines of code within composite code 107 subsequent to the application of the code overlays. In another embodiment, code overlay integration program 300 applies two or more code overlays in a serial process (e.g., one at a time). Code overlay integration program 300 tracks updates to the numbering of composite code 107 after each code overlay is applied. Code overlay integration program 300 tracks the changes in the numbering associated with composite code 107 and applies the changes to the offset/index values of subsequent applications of code overlays.

In further embodiments, code overlay integration program 300 may apply actions dictated by syntax within a code overlay at specified locations within source code 106. For example, a code overlay may dictate that code lines 5, 25, and 40 of source code 106 are commented out and are inserted for code lines 5, 25, and 40, and the debug code of the code overlay is inserted at code line 60 (e.g., offset/index value 60).

In a different embodiment, code overlay integration program 300 may apply actions dictated by a code overlay at locations within source code. For example, a code overlay may dictate that code lines 5, 25, and 40 of source code 106 (import util.list) are deleted. In this example, code overlay integration program 300 has reduced the length of source code 106 by three lines of computer instructions. In response to the reduction in the number of lines of comprising source code 106, code overlay integration program 300 renumbers composite code and adjusts the offset location for debug code of the code overlay. For example, code line 60 becomes program line 57.

In decision step 308, code overlay integration program 300 determines whether one or more additional code overlays are applied to source code 106. In some embodiments, code overlay integration program 300 determines that additional code overlays are applied to source code 106 based on automated input (e.g., a script, a table, etc.). In other embodiments, code overlay integration program 300 determines that additional code overlays are applied to source code 106 based on input from a user (e.g., a user of client device 130).

In response to determining that additional code overlays are applied to the source code (yes branch; decision step 308), code overlay integration program 300 optionally updates one or more code overlays (step 320). In some embodiments, the offset value that determines the location at which a code overlay applies to source code 106 is defined within the code overlay. If code overlay integration program 300 determines that another instance of the code overlay occurs at a second location associated with source code 106, then code overlay integration program 300 updates the code overlay by defining a second offset value within the code overlay. Subsequently, code overlay integration program 300 loops to step 304.

In response to determining that additional code overlays are not applied (no branch; decision step 308), code overlay integration program 300 detects whether one or more modifications occur to source code 106 (decision step 310). In one embodiment, code overlay integration program 300 compares the file attributes (e.g., file size, time stamp, etc.) of source code 106 stored in file storage 104 to the previously determined file attributes of the received version of source code 106 (step 302) to determine whether source code 106 is modified. In another embodiment, code overlay integration program 300 respectively compares the file attributes of instances of source code 106 in file storage 124, on client device 120, in file storage 134, on client device 130, and in file storage 104 on server 102 to determine whether one of the instances of source code 106 is modified.

In decision step 310, in response to detecting that one or more modifications occurred to source code 106 (yes branch; decision step 310), code overlay integration program 300 resolves the conflict associated with the one or more detected modifications to source code 106 (step 322).

In step 322, code overlay integration program 300 generates composite code 107. In one embodiment, code overlay integration program 300 resolves the conflict between versions (e.g., copies of source code 106 that contain different modifications) of source code 106 and uses the initial version of source code 106. In one scenario, code overlay integration program 300 resolves the conflict by determining that code overlay creation program 200 and code overlay integration program 300 are operating on the same version of source code 106. For example, a user of client device 120 and a user of client device 130 may be non-collaboratively debugging respectively developed portions of source code 106 where both users modify source code 106 while creating code overlays for their respective portions of source code 106. Code overlay integration program 300 can determine that each user is executing different instances of code overlay creation program 200 and code overlay integration program 300 and determine that such modifications to source code 106 do not cause a conflict. In another scenario, code overlay integration program 300 can determine that a user of client device 120 and client device 130 are collaboratively debugging portions of source code 106 that were respectively developed and determine that no conflict occurs because the modification of portions of source code 106 of one user do not occur at the locations of code overlays of the other user. In some scenarios, code overlay integration program 300 resolves the conflict between versions of source code 106 by analyzing at least one of one or more user preferences and one or more software development preferences. For example, code overlay integration program 300 determines that a software development preference dictates that a user download a copy of source code 106 to local storage (e.g., file storage 124 on client device 120) and execute code overlay creation program 200 and code overlay integration program 300 remotely via UI 122.

Referring to step 320, in some embodiments, code overlay integration program 300 updates one or more code overlays based on the results of step 322. For example, if code overlay integration program 300 determines that the modified version of source code 106 is used, then code overlay integration program 300 updates the offset values of one or more code overlays affected by the updates to source code 106.

In another embodiment, code overlay integration program 300 determines that the modified version of source code 106 is used to generate a new composite code 107. In addition, code overlay integration program 300 detects that the modifications deleted one or more portions of source code 106 that existed prior to the modifications and those deleted portions of source code 106 contained locations where one or more code overlays were applied. In one scenario, code overlay integration program 300 removes the code overlays and offset values (e.g., location information) associated with the code overlays in the deleted portions of source code 106 from the subsequent generation of composite code 107. In another scenario, code overlay integration program 300 contacts a user of client device 120 via network 110 and UI 122 and awaits a disposition for the one or more affected code overlays.

Referring to decision step 310, if code overlay integration program 300 does not detect modifications to source code 106 (no branch; decision step 310), then code overlay integration program 300 displays and/or executes composite code 107 (step 314). In one embodiment, code overlay integration program 300 includes display capabilities that enable a user to view composite code 107. In another embodiment, code overlay integration program 300 utilizes the display capabilities of software editing program 108 to display composite code 107. In some embodiments, code overlay integration program 300 differentiates the display of one or more code overlays from code lines of source code 106.

In addition, code overlay integration program 300 may execute composite code 107. In some embodiments, code overlay integration program 300 interacts with an IDE and presents some or all of the interactions to the user of client device 120 via UI 122. In one embodiment, code overlay integration program 300 executes composite code 107 for the purpose of a user preforming at least one of debugging and testing composite code 107. In one scenario, code overlay integration program 300 saves the results of the execution of composite code 107 in one or more separate files for off-line analysis. For example, the one or more resultant files of testing and/or debug activity may include error codes, error messages, variables, execution paths, lists, database tables, etc. In another scenario, testing and debugging information is accessible via code overlay integration program 300. In some instances, code overlay integration program 300 includes or accesses various debugging capabilities (e.g., stop on error, execute block, execute line, etc.). In another embodiment, code overlay integration program 300 enables multiple users (e.g., a user of client device 120 and a user of client device 130) to test and debug composite code 107. In one scenario, code overlay integration program 300 executes one instance of composite code 107, and multiple users review and respond to that one instance. In another scenario, code overlay integration program 300 creates multiple instances of composite code 107, which the multiple users may view via the execution of composite code 107 on server 102, on client device 120, on client device 130, or any combination thereof.

In step 316, code overlay integration program 300 optionally stores the composite code configuration prior to terminating. In one embodiment, code overlay integration program 300 stores composite code 107 as the composite code configuration (e.g., a file containing source code 106 as modified by any code overlays and all associated code overlays and their respective locations.). In another embodiment, code overlay integration program 300 produces a configuration (e.g., testing/debugging scheme) structured as a list, a table, or a combination thereof, which includes the code overlays and their respective locations that a user applied to source code 106 during this testing and debug cycle. Such lists and/or tables can include information, such as code overlay names, code overlay directory locations, source code file names and versions, source code file locations, code overlay locations, results of executing composite code 107, permission levels, authors (e.g., programmers) of composite code 107, editors (e.g., programmers) of composite code 107, etc.

In another embodiment, code overlay integration program 300 receives an indication from a user of client device 130 that the testing and debugging of source code 106 is complete. Additionally, code overlay integration program 300 receives a list of instructions which may indicate which code overlays to convert to source code, which code overlays to remove from composite code 107, which stored code overlays that are reincorporated within composite code 107, and the name, revision information, and a storage location for the source code generated by the instructions.

FIG. 4a is an illustrative example of a snippet of source code which is subsequently acted on by code overlays, in accordance with an embodiment of the present invention.

Item 400 represents a visual depiction of a snippet of source code. Source code snippet 400 is a portion of a version of source code 106, identified by file name scr_code001.cpp (item 401).

Column 402 depicts the line numbers of each line of code of source code file scr_code001.cpp (item 401) within source code snippet 400.

Column 403 depicts lines of programming code of source code file scr_code001.cpp (item 401), depicted within source code snippet 400.

Figure 4B:
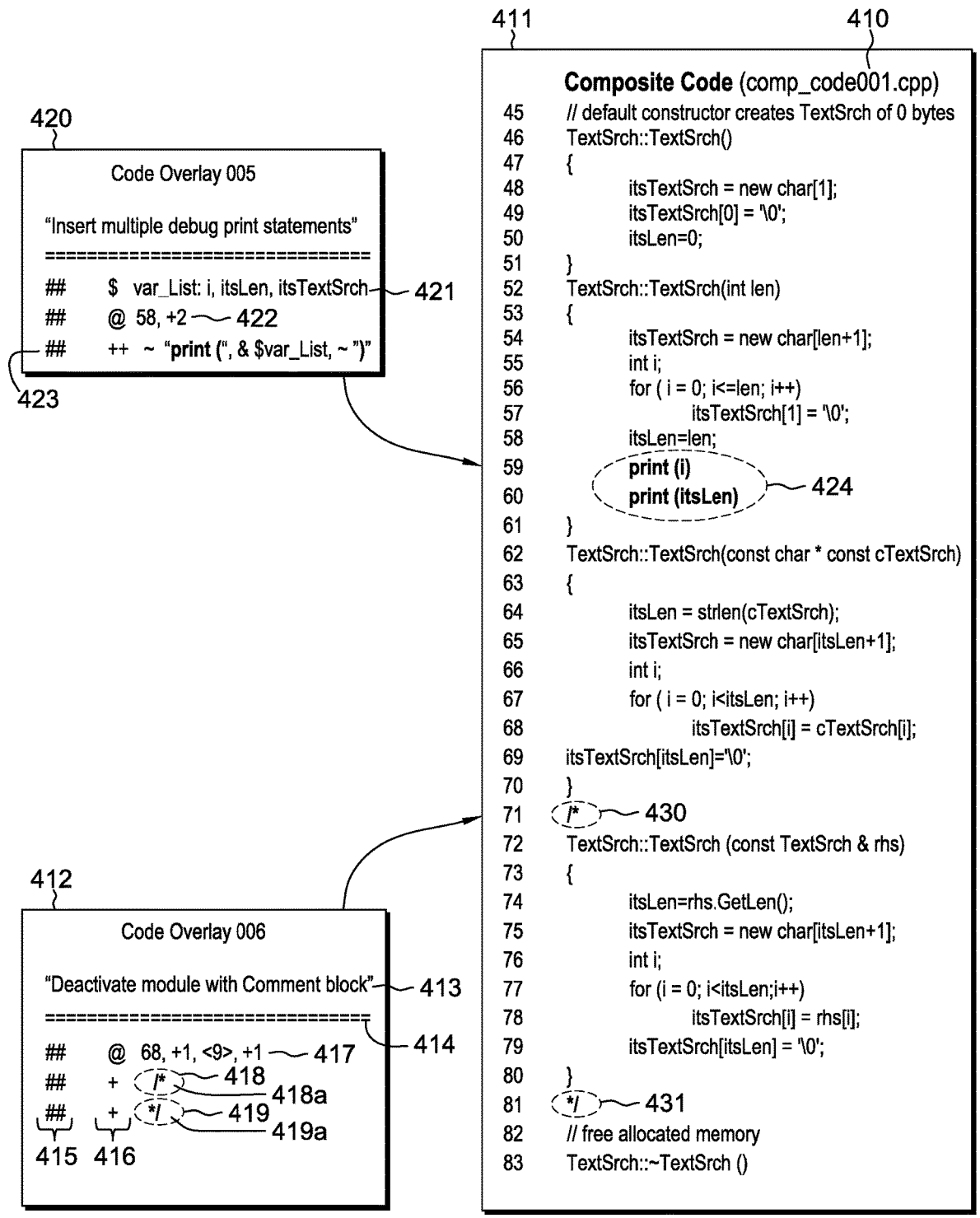
FIG. 4b depicts an illustrative example of results of two code overlays applied to the source code snippet of FIG. 4a to generate a snippet of composite code, in accordance with an embodiment of the present invention.

FIG. 4b is an illustrative example of the results of code overlay 005 (item 420) and code overlay 006 (item 412) being applied to source code 106 file name scr_code001.cpp (item 401) to generate composite code snippet 411, in accordance with an embodiment of the present invention. In this illustrative example, code overlay 005 (item 420) is received (e.g., step 304) and is applied (e.g., step 306) to source code 106 file name scr_code001.cpp (item 401) to generate composite code snippet 411. A user indicates to code overlay integration program 300 that an additional code overlay 006 (item 412) is applied (e.g., yes branch; decision step 308) to source code 106 file name scr_code001.cpp (item 401). Code overlay 006 (item 412) is received and applied to generate composite code 107 file name comp_code0001.cpp (item 410) depicted in composite code snippet 411.

Code overlay 006 (item 412) depicts an illustrative example of a code overlay, in accordance with an embodiment of the present invention. Code overlay 006 (item 412) comprises comment line 413, delimiting line 414, and three lines of text (e.g., functional lines), which are further comprised of actors (e.g., output text) and actions (e.g., functions) (in columns 415 and 416). Comment line 413 describes the purpose of code overlay 006 (item 412). Code overlay 006 (item 412) deactivates a code module with comment block commands. For example, if column 415 contains two hash symbols/pound signs (i.e., ##), then one or more actions occur based on subsequent symbols and text. In some embodiments, additional instances of delimiting line 414 and comment line may include additional information, such as meta-data, authorship of the code overlay, tags, version number, directory location, etc. In other embodiments, code overlays may utilize syntax symbols and conventions of other languages (e.g., HTML) when including functional text. For example, a code overlay may include syntax, separated by an addition delimiting line, that identifies another programming language (e.g., HTML) whose syntax is utilized. The syntax of the code overlay may include a flag specifying the starting point for the use of other programming language and the stopping point for the use of the other programming language.

Column 416 depicts two types of actions. An at-sign (i.e., @) in column 416 signifies that subsequent symbols and text are associated with one or more line numbers (e.g., offset/index values) of source code (e.g., scr_code001.cpp (item 401)). An isolated plus sign (i.e., +) in column 416 signifies that the subsequent symbols and text are added to a source code file (e.g., scr_code001.cpp (item 401)) at one or more locations. In some embodiments, functional syntax is utilized outside of column 416. In this example, additional symbols and the associated syntax/function include, but are not limited to: a dollar sign ("$") signifying a variable string (e.g., variable name: list of list); a comma (",") for separating functions, function inputs, syntax, text, and items of a list; a tilde ("~") for translating or extracting information within quotation marks; an ampersand ("&") for applying or incorporating an element; a plus sign followed by a number (e.g., "+1") for adding/inserting a certain number of elements, lines, etc.; a minus sign followed by a number (e.g., "−1") for deleting a certain number of elements, lines, etc.; and angled brackets enclosing a number (e.g., "<9>"), for skipping/moving forward a certain number of lines of code.

For example, the syntax of functional line 417 decodes as: after (e.g., @) code line 68 (e.g., offset/index value 68) of source code file scr_code001.cpp (item 401), add one line of information from next line (line 418) of code overlay 006 (item 412), skip nine lines relative to code line 68 of source code file scr_code001.cpp (item 401), and add one of information from next line (line 419) of code overlay 006 (item 412).

In code overlay 006 (item 412), line 418 decodes as an action occurs (e.g., ##), and the action is to add (+) callout 418*a* (/*). Based on the first set of values of the insert action of functional line 417, callout 418*a* (/*) is added after line 68 of source code scr_code001.cpp (item 401). Next, line 419 decodes as an action occurs (e.g., ##) and the action is to add (e.g., +) callout 419*a* (/*). Based on the second set of values of the insert action of functional line 417, nine lines of code are skipped, and one line of code from code overlay 006 (item 412) is added (e.g., callout 419*a* (*/)). Callout 419*a* (*/) is added after line 78 of source code scr_code001.cpp (item 401). However, code overlay 005 (item 420) is added prior to code overlay 006 (item 412), which indicates an additional code overlay is applied (e.g., yes branch; decision step 308). Code overlay integration program 300 updates one or more index/offset values associated with code overlay 006 (item 412) based on the effects that code overlay 005 (item 420) has on composite code 107, as depicted by the increased code lines associated with callout 424 (e.g., step 320).

In code overlay 005 (item 420), the purpose described in the comment line is that the code overlay inserts multiple debug print statements. Line 421 decodes as: define a variable string (e.g., $) named var_List comprised of variables i, itsLen, and itsTextSrch, which are respectively located at code lines 56, 58, and 54 of source code snippet 400.

In code overlay 005 (item 420), functional line 422 decodes as: after code line 68 of source code file scr_code001.cpp (item 401), add two of information from next line (functional line 423) of code overlay 005 (item 420). However, code overlay 005 (item 420) is applied to source code file scr_code001.cpp (item 401) prior to code overlay 006 (item 412). Code overlay integration program 300 tracks the numbering change associated with the application of code overlay 005 (item 420) which adds two lines after code line 58. Code overlay integration program 300 adds two to the offset/index value associated with code overlay 006 (item 412).

In functional line 423 of code overlay 005 (item 420), the action indicator (##) is followed by two plus signs (++). In some embodiments of the present invention, the syntax of stringing two actions of the character together signifies that the action is repeated. The number of repetitions is based on information contained in one or more previous commands. In this example, functional line 422 indicated that two lines are added. In functional line 423 the tilde symbol (~) is combined with an ampersand (&), and the ampersand is associated with a string variable, var_List. In an embodiment, such a combination of syntax may initiate the creation of temporary pseudo code. With respect to functional line 423, code overlay temporarily generates two lines of text respectively incorporating the first variable of var_List (i) and the second variable of var_List (itsLen). The lines of text generated by functional line 423 and applied to source code file scr_code001.cpp (item 401), based on functional line 422, are depicted in callout 424 within composite code snippet 411.

Subsequently, code overlay integration program 300 applies of code overlay 006 (item 412). Based on the increase of two code lines resulting from applying code overlay 005 (item 420), callout 418*a* appears in composite code snippet 411 at code line 71 (e.g., callout 430). Similarly, callout 419*a* of code overlay 006 (item 412) appears in composite code snippet 411 at code line 81 (e.g., callout 431).

Figure 4C:
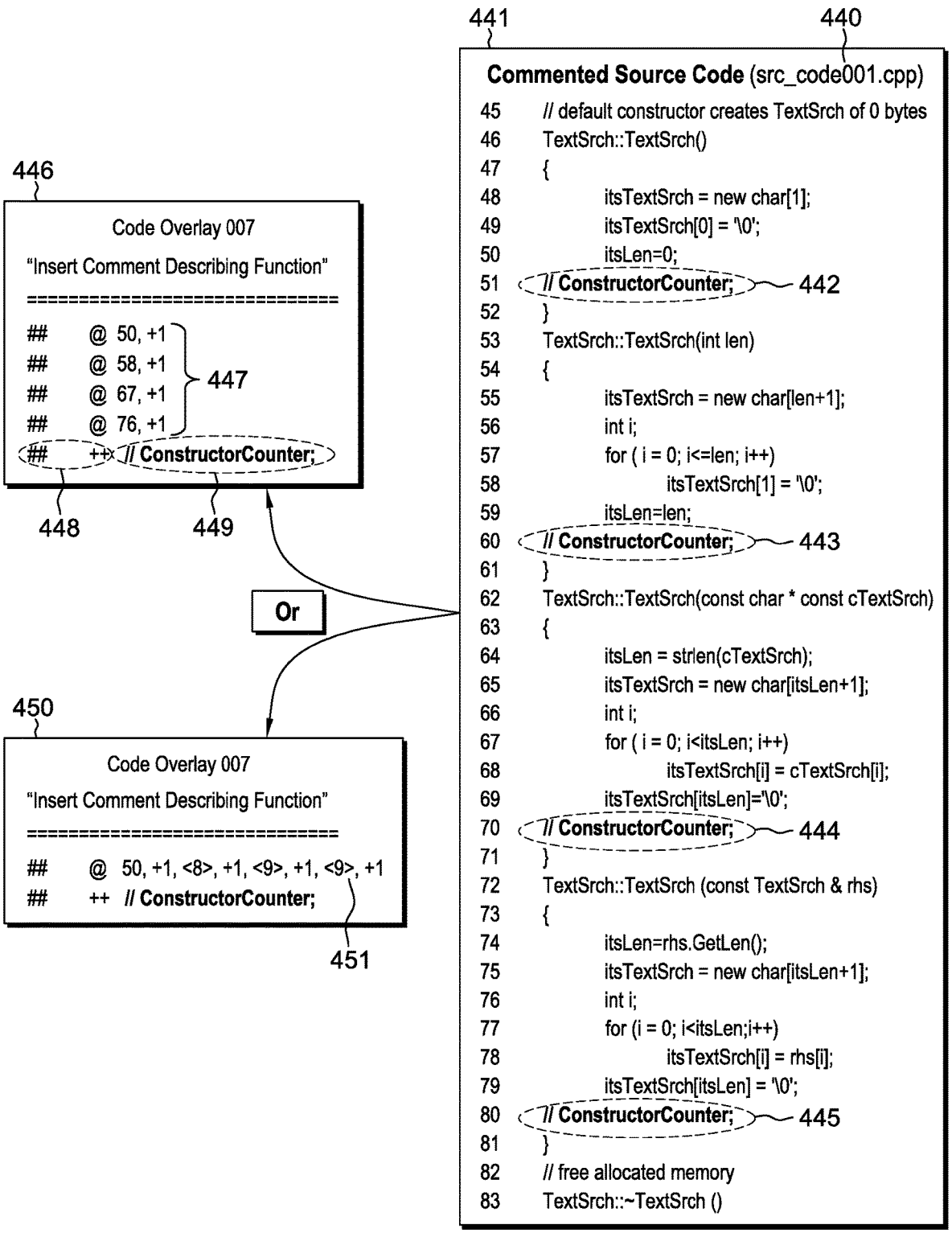
FIG. 4c depicts an illustrative example of creating a code overlay comprised of a descriptive comment from text added at multiple locations in the source code snippet of FIG. 4a, in accordance with an embodiment of the present invention

FIG. 4*c* is an illustrative example of creating code overlay 007 (item 446 or item 450) based on modifications to a different instance of source code 106 file name scr_code001.cpp (item 440) to generate commented source code snippet 441 utilizing software editing program 108, in accordance with an embodiment of the present invention.

Commented source code snippet 441 depicts modification to a source code snippet 400 of a different instance of source code 106 file name scr_code001.cpp (item 401). The modification comprises adding four instances of comment "//ConstructorCounter;", as depicted in callouts 442, 443, 444, and 445. In one embodiment, the comment of callout 442 is pasted into source code 106 file name scr_code001.cpp (item 401) after code line 50 and flagged as code overlay content (e.g., step 202). Code overlay creation program 200 subsequently determines an offset/index of 50 for callout 442 (e.g., step 206). When the comment associated with callout 443 is added and flagged as code overlay content (e.g., step 208), then code overlay creation program 200 detects the modification (e.g., yes branch; decision step 210). Code overlay creation program 200 determines that the initial source code is not used (no branch; decision step 216), and then code overlay creation program 200 determines an offset/index value for the comment depicted by callout 443 (e.g., step 206).

In commented source code snippet 441, the depicted code line for callout 433 is 60, which represents an offset/index appears at 59. However, code overlay creation program 200 tracked the lines of content associated with callout 442 (one line) and biases the offset/index value for the comment of callout 443 to 58. Similarly, when the comment depicted at callout 444 is added to the code in commented source code snippet 441, code overlay creation program 200 determines that the code line number is 69 and biases the code line number by 2 (one line for callout 442 and one line for callout 443). Finally, when the comment depicted at callout 445 is added to the code in commented source code snippet 441, code overlay creation program 200 determines that the code line number is 79 and biases the code line number by 3 (one line for callout 442, one line for callout 443, and one line for callout 444). In some embodiments, code overlay creation program 200 identifies content that is repeated, and code overlay creation program 200 utilizes that information generate a summarized structure for a code overlay. For example, callouts 442, 443, 444, and 445 are identical and are represented in a code overlay as depicted at callout 449.

In one embodiment, the content of callouts 442, 443, 444, and 445 is added in a serial manner, and code overlay creation program 200 creates code overlay 007 (item 446). In one scenario, code overlay creation program 200 summarizes the offset/index values (in step 206) utilizing syntax referred to in the discussion of column 415 and column 416. For example, the four functional lines that comprise item 447 describe the offset/index values for applying single lines of text to a source code file. The syntax of the function lines decodes as: an action occurs (e.g., ##), after (e.g., @) an offset/index value, and add one line (e.g., +1). The offset/index values for callouts 442, 443, 444, and 445 are 50, 58, 67, and 76 respectively.

In another embodiment, code overlay creation program 200 receives the content of callouts 442, 443, 444, and 445 in a parallel manner. For example, code lines 51, 60, 70, and 80 of commented source code snippet 441 are highlighted in one operation and flagged as content for code overlay 007 (item 447). In this example, code overlay creation program 200 may determine a code offset/index value for callout 442. Subsequently, code overlay creation program 200 determines that callouts 442, 443, 444, and 445 are comprised of identical text and are one line long. In step 206, code overlay creation program 200 utilizes the offset/index value for callout 442 of 50 (code line number 51-one line) and determines relative offset/index values (e.g., skip lines) of 8, 9, and 9 for callouts 443, 444, and 445. Callout 448 depicts functional syntax comprised of an action indication (e.g., ##) and the action to occur (e.g., ++). In some embodiments of the present invention, the syntax of stringing two actions of the character together signifies that the action is repeated. In this instance, callout 449//ConstructorCounter; represents callouts 442, 443, 444, and 445 depicted in commented source code snippet 441. Code overlay creation program 200 utilizes this information to produce the syntax depicted in function line 451. In the above embodiments, code overlay creation program 200 generates code overlay 007 (item 446) and code overlay 007 (item 450) which are different but functionally equivalent.

Figure 5:
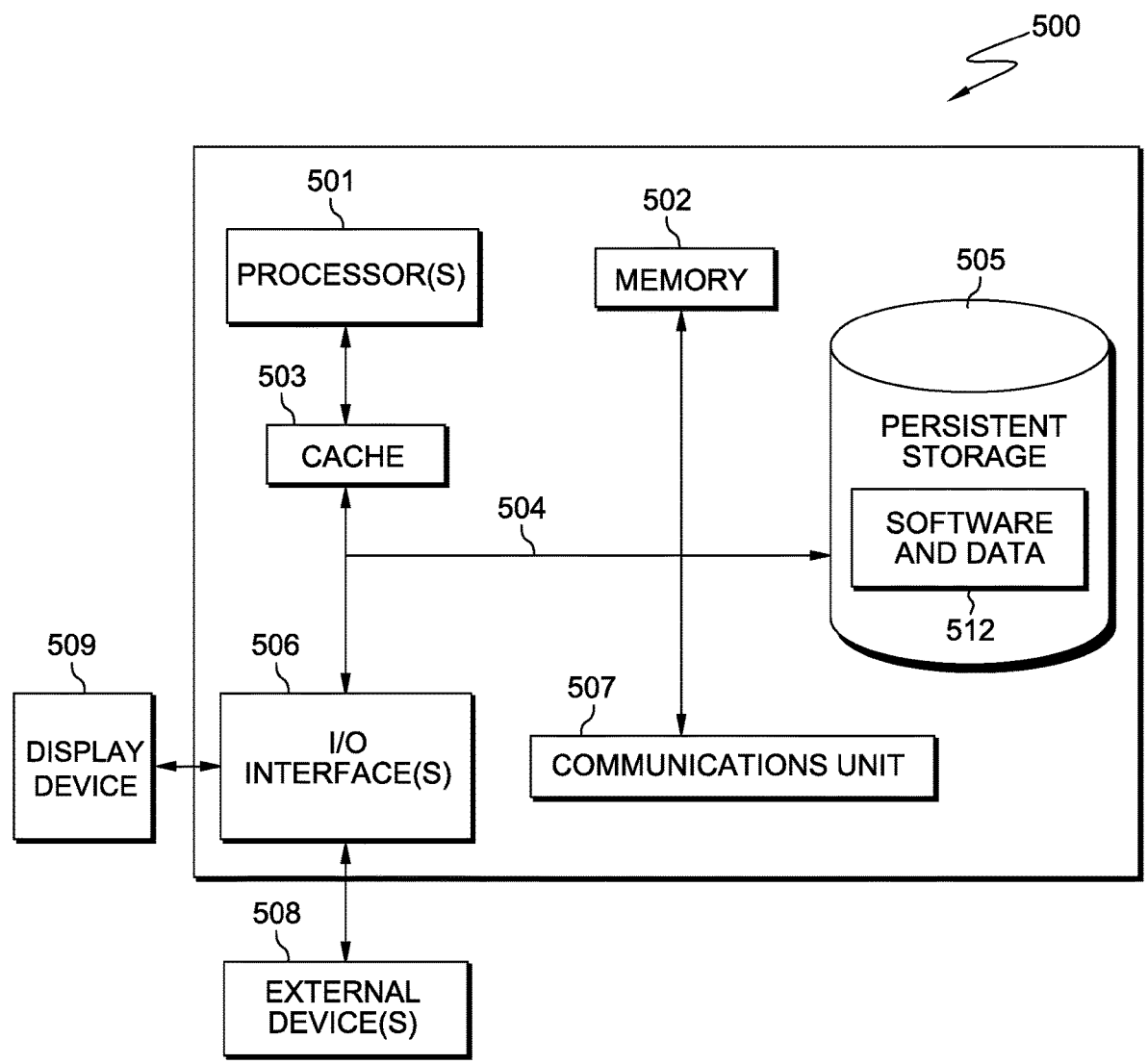
FIG. 5 is a block diagram of components of a computer, in accordance with an embodiment of the present invention.

FIG. 5 depicts computer system 500, which is representative of server 102, client device 120, and client device 130. Computer system 500 is an example of a system that includes software and data 512. Computer system 500 includes processor(s) 501, cache 503, memory 502, persistent storage 505, communications unit 507, input/output (I/O) interface(s) 506, and communication fabric 504. Communication fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to server 102, software and data 512 includes file storage 104, source code 106, composite code 107, software editing program 108, code overlay creation program 200, code overlay integration program 300, and various programs (not shown). With respect to client device 120, software and data 512 includes user interface (UI) 122, file storage 124, and various programs (not shown). With respect to client device 130, software and data 512 includes user interface (UI) 132, file storage 134, and various programs (not shown).

Communications unit 507, in these examples, provides for communications with other data processing systems or devices, including resources of server 102, client device 120, and client device 130. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display device 509.

Display device 509 provides a mechanism to display data to a user and may be, for example, a computer monitor. Display device 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system, comprising:
at least one server having one or more memories storing instructions and having one or more processors configured to execute the instructions to cause the system to perform operations comprising:
receiving a first file comprising computer programming code that has been debugged via a debugging process;
receiving code overlay content from the computer programming code, wherein the code overlay content comprises one or more modifications applied to the computer programming code of the first file as a result of the debugging process;
generating a code overlay based on the code overlay content, wherein the code overlay includes the one or more modifications;
generating a second file comprising composite computer programming code, wherein the composite computer programming code comprises the computer programming code of the first file modified by the code overlay;
executing the composite computer programming code of the second file; and
storing the first file and the second file within the one or more memories.

2. The system of claim 1, wherein generating the second file comprising the composite computer programming code does not alter the computer programming code of the first file.

3. The system of claim 1, wherein the one or more modifications of the code overlay comprise adding additional computer programming code, adding a comment, removing a portion of the computer programming code, removing a comment, or a combination thereof.

4. The system of claim 1, wherein the code overlay comprises one or more modification locations associated with a respective modification of the one or more modifications, and the computer programming code of the first file is modified by the one or more modifications of the code overlay based on the one or more modification locations.

5. The system of claim 1, wherein the one or more modifications of the code overlay comprises removing a portion of the computer programming code, and wherein generating the code overlay based on the code overlay content comprises preserving the removed portion of the computer programming code in the code overlay.

6. A method, comprising:
receiving, via one or more processors, a first file comprising computer programming code that has been debugged via a debugging process;
receiving, via the one or more processors, code overlay content from the computer programming code, wherein the code overlay content comprises one or more modifications applied to the computer programming code of the first file as a result of the debugging process;
generating, via the one or more processors, a code overlay based on the code overlay content, wherein the code overlay includes the one or more modifications;
generating, via the one or more processors, a second file comprising composite computer programming code, wherein the composite computer programming code comprises the computer programming code of the first file modified by the code overlay;
executing, via the one or more processors, the composite computer programming code of the second file; and
storing, via the one or more processors, the first file and the second file within a storage location.

7. The method of claim 6, wherein generating the second file comprising the composite computer programming code does not alter the computer programming code of the first file.

8. The method of claim 6, comprising:
determining, via the one or more processors, that the composite computer programming code is absent from a third file comprising the computer programming code of the first file; and
updating, via the one or more processors, the computer programming code of the third file based on the one or more modifications of the code overlay.

9. The method of claim 6, comprising:
determining, via the one or more processors, that a third file includes the computer programming code of the first file modified by one or more additional modifications of an additional code overlay; and
updating, via the one or more processors, the composite computer programming of the second file based on the one or more additional modifications of the additional code overlay.

10. The method of claim 6, wherein the composite computer programming code comprises one or more modified portions of the computer programming code, and wherein the one or more modified portions are configured to output error information, output information specified by the code overlay, pause the execution of the composite computer programming code, generate one or more handling exceptions, store data, or a combination thereof.

11. The method of claim 6, comprising transmitting, via the one or more processors, the composite computer programming code of the second file for display on a client device, wherein unmodified portions of the composite computer programming codes are displayed differently than modified portions of the composite computer code.

12. The method of claim 6, wherein the one or more modifications of the code overlay comprises removing a portion of the computer programming code, and wherein generating, via the one or more processors, the code overlay based on the code overlay content comprises preserving, via the one or more processors, the removed portion of the computer programming code.

13. The method of claim 6, comprising receiving, via the one or more processors, an additional code overlay comprising one or more additional modifications to be applied to the computer programming code of the first file, and wherein generating, via the one or more processors, the second file comprises modifying the computer programming code of the first file based on the code overlay and the additional code overlay in parallel.

14. A tangible, non-transitory, machine-readable medium, comprising instructions, that, when executed by one or more processors, cause the one or more processors to:
receive a first file comprising computer programming code that has been debugged via a debugging process;
receive code overlay content from the computer programming code, wherein the code overlay content comprises one or more modifications applied to the computer programming code of the first file as a result of the debugging process;
generate a code overlay based on the code overlay content, wherein the code overlay includes the one or more modifications;

generate a second file comprising composite computer programming code, wherein the composite computer programming code comprises the computer programming code of the first file modified by the code overlay;

execute the composite computer programming code of the second file; and store the first file and the second file within a storage location.

15. The system of claim 14, wherein the instructions that cause the one or more processors to generate the second file comprising the composite computer programming code include generating the second file without altering the computer programming code of the first file.

16. The system of claim 14, comprising machine-readable instructions that, when executed by the one or more processors, cause the one or more processors to:

determine that the composite computer programming code is absent from a third file comprising the computer programming code of the first file; and update the computer programming code of the third file based on the one or more modifications of the code overlay.

17. The system of claim 14, comprising machine-readable instructions that, when executed by the one or more processors cause the one or more processors to:

determine that a third file includes the computer programming code of the first file modified by one or more additional modifications of an additional code overlay; and update the composite computer programming of the second file based on the one or more additional modifications of the additional code overlay.

\* \* \* \* \*